Patented Mar. 15, 1932

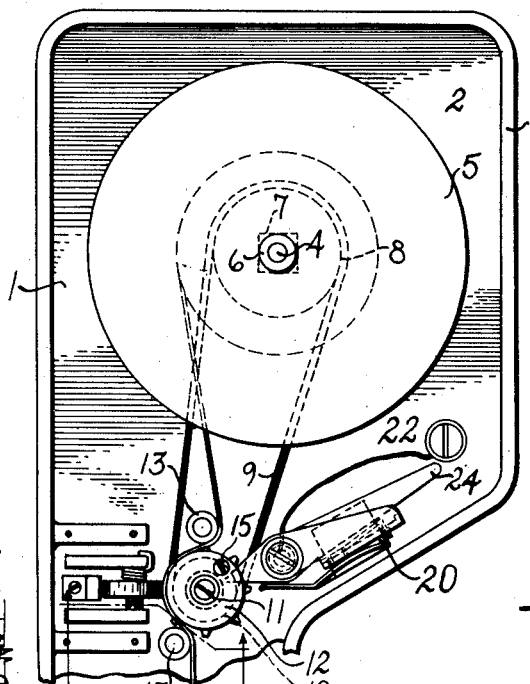

1,849,227

UNITED STATES PATENT OFFICE

EDWIN C. FRITTS, OF ROCHESTER, NEW YORK, ASSIGNOR TO EASTMAN KODAK COMPANY, OF ROCHESTER, NEW YORK, A CORPORATION OF NEW YORK

FILM MEASURING CONTROL

Application filed December 20, 1929. Serial No. 415,460.

This invention relates to photography and more particularly to an automatic control for film winding mechanisms. One object of my invention is to provide a device which will automatically control the quantity of film which may be wound on a film reel. Another object of my device is to provide a means for regulating the film wound on a film spool in a camera. Still another object of my invention is to provide a film winding mechanism with a power drive which will be automatically cut off when convolutions of film wound on a reel reach predetermined proportions and other objects will appear from the following specification, the novel features being particularly pointed out in the claims at the end thereof.

This invention is particularly suited to cameras of the type used for making photographs of checks or other documents, such a camera being fully shown in my Patent 1,730,930 for "duplex camera", issued October 8, 1929. For details of a camera structure partially shown in the present drawings reference may be had to this patent.

Coming now to the drawings wherein like reference characters denote like parts throughout:

Fig. 1 is a fragmentary plan view of a portion of a camera equipped with a film measuring signal constructed in accordance with and embodying a preferred form of my invention;

Fig. 2 is a fragmentary plan view of a measuring switch used in connection with my invention with the parts in a different position;

Fig. 3 is a fragmentary sectional view showing the measuring switch parts and their relation to a film driving sprocket;

Fig. 4 is a fragmentary detailed section showing on an enlarged scale a pair of contact members;

Fig. 5 is a section on line 5—5 of Fig. 1; and,

Fig. 6 is a schematic showing of a wiring diagram which illustrates a circuit for the measuring switch.

As shown in my above mentioned patent the camera may consist of a casing, a part of which is shown at 1 as comprising a take-up chamber 2 having walls 3 extending around the chamber and having a post designated broadly as 4 upon which a film winding mechanism, here shown in the form of a reel 5, may be mounted.

The post 4 preferably consists of a circular portion 6 and a square portion 7, the latter being adapted to engage in a complementary opening in the flange of the film reel 5 so that this reel may be turned through this connection.

The square section 7 of the post 4 may be driven by power through a pulley 8, wire belt 9 and a pulley 10, the latter being on a shaft 11 which turns by power a film sprocket 12.

The source of power for the shaft 11 is not shown in the present application since it is not necessary for a complete understanding of the present invention. However, power is derived in the same manner as in my copending application, Serial Number 415,461, filed December 20, 1929.

For the purpose of this invention the power drive may be through a motor or other suitable source of power which may be attached to shaft 11 in any convenient manner.

The film F, after being exposed, may be lead over the guide rollers 13 which press it against the film sprocket 12 so that it may be moved from an exposure gate. From the sprocket 12 the film is wound in convolutions upon a take-up device which may include a spool 5 as above described.

It is important in cameras and particularly in recording cameras which are used to make records to be certain that the film is winding properly through the camera and that there is film in the camera for making the desired exposures. Accordingly, the sprocket 12 over which the film F must pass is provided with the following safeguards which will automatically stop the machine in case of improper winding or in case the film becomes exhausted.

The sprocket 12 is provided with a groove 14 which is annular in shape and across which a pin 15 extends. In this groove the end 16 of a lever 17 pivoted on a stud 18 passes in such a manner that at each revolution of the sprocket 12 the end 14, by striking the pin 15, rocks the lever 17 in one direction and a spring 19 immediately returns the lever 17 to the position shown in Fig. 1 after each rocking movement. The movement of the lever 17 in one direction is limited by means of a bracket 20 which is attached at 21 to the camera wall 22. The spring 19 normally holds the lever 17 against this bracket. A second arm 23 is also pivoted on the stud 18 is insulated from lever 17, and is normally pressed away from lever 17 by means of the spring 24'. The movement of lever 23 relative to lever 17 is limited by means of a flange 26 which also forms a contact.

When the end 24 of lever 23 contacts with outer convolutions of film as indicated at 25 in Fig. 2 the lever 23 is pressed toward lever 17 and a contact is made with the contact 26 as shown in Fig. 4, the position in dotted lines indicating the position of lever 23 when a contact is being made. Thus, these two pivoted levers form a feeler switch which contacts with the film periodically and which is adapted to make a circuit and through a relay release a switch so that the operation of the machine will cease as will be more fully hereinafter described.

In the present instance the sensitive or emulsion side of the film F lies on the side indicated by $f$ so that it faces the center of the film reel. The back of the film is touched by the lever 24 only when the film convolutions come near the periphery of the film reel 5 and then only at spaced intervals occasioned by the pin 15 of the sprocket striking the lever 16.

Thus, while levers 17 and 24 oscillate throughout the operation of the machine during practically all of the time that convolutions of film are being wound on the reel 5, the end 24 moves idly between the spool flanges of reel 5 without touching the film. It is only when the convolutions approach an outer limit in diameter that the arm 24 touches the film at all and after touching the film once or twice the arm 24 is moved a sufficient distance with respect to the arm 17 to make the circuit which will instantly stop the machine.

As shown in Fig. 4 this distance is not a large one, the position shown in full lines being the inoperative position and the position shown in broken lines being the operative position or that in which the circuit is made.

I prefer to equip my cameras with a second safeguard which will indicate that the film is passing properly over the sprocket 12. Accordingly, the sprocket 12, as best shown in Fig. 5, is recessed across its central portion as indicated at 30, the sprocket teeth 31 being on the raised edges 32 of the sprocket. A film F reaches across the relieved portion 30 and a rounded arm 33 which is provided with an extremely smooth polished periphery 34 is adapted to lightly contact with the film F being pressed towards it by a light spring 35. If the film should buckle after passing the lowermost guide roller 13 the arm 33 may be thrust in a clockwise direction about its pivotal support 36 and into contact with a post 37, thus making a circuit as will be more fully hereinafter described.

If the film F should break and fail to reach the sprocket 12 the arm 33 would swing in a counter-clockwise direction and contact with the relieved portion 30 of the sprocket 12, thus making a circuit. In other words, if the film is not in its proper position while passing over the sprocket 12 a circuit is made.

Fig. 6 shows in a diagrammatic way a circuit which may be used with the parts above described. A battery 40 supplies power to a wire 41 which leads to a relay 42. A second wire 43 is broken by a single-way switch 44 which corresponds with the switch between the pivoted arms 17 and 23 and a second two-way switch 45 which corresponds with the switch shown in Fig. 5. If either one of these switches make a circuit the relay 42 will be operated and the switch 46 will be opened so that a motor used to drive the camera mechanism will cease to operate.

With the invention as above described, any improper movement of the film over or above sprocket 12 will cause the machine to stop. If the film spool 5 receives all of the film that it can normally hold, the winding operation will also stop, due to the feeler switch which oscillates back and forth between the spool flanges. The feeler switch has advantages over other types because by only occasionally touching outside convolutions of film a minimum of scratches is caused, and still more important, because the drive of reel 5 through belt 9 must necessarily be light in order not to break the film and any pressure which is constant upon the film particularly as the convolutions increase in size, is liable to prevent the film from winding properly.

While I have shown and described a film spool as being the preferred type of take-up mechanism obviously any kind of a film-winding device can be used and the flanges of the spool may be omitted as desired.

Having thus described my invention, what I claim as new and desire to secure by Letters Patent is:

1. In photographic apparatus, the combination with a film coiling device, a sprocket adapted to supply film to the film coiling device and mechanism operated through the film supplying means adapted to periodically move toward, without touching, convolutions of film wound thereon and to contact with the film when the convolutions reach a predetermined size.

2. In photographic apparatus, the combination with a film coiling device, a sprocket adapted to supply film to the film coiling device and having an eccentric mounted thereon, mechanism adapted to be operated by the eccentric and adapted to move toward convolutions of film wound on the coiling device and to contact with convolutions of film wound thereon, when said convolutions are of a predetermined diameter.

3. In photographic apparatus, the combination with a film coiling device, a sprocket adapted to supply film to the film coiling device, an eccentric stud mounted on the sprocket, a feeler arm pivoted to the camera, and lying in the path of the stud, said stud being adapted to move said arm periodically toward convolutions of film wound on the film coiling device.

4. In photographic apparatus, the combination with a flanged film reel, of a slotted sprocket adapted to furnish film to the film reel, a stud extending across the slot in the sprocket, an arm pivotally mounted, and extending into said slot to be actuated by the stud, a portion of said arm being adapted to be moved by said stud between the spool flanges.

5. In photographic apparatus, the combination with a flanged film reel, of a slotted sprocket adapted to furnish film to the film reel, a stud extending across the slot in the sprocket, an arm pivotally mounted and extending into said slot to be actuated by the stud, a portion of said arm being adapted to be moved by said stud between the spool flanges, a spring for normally holding the arm away from the film reel, said spring permitting the arm to be moved against spring pressure by the stud.

6. In photographic apparatus, the combination with a film coiling device, of a sprocket adapted to feed film to the coiling device, an intermittently moved arm operatively connected to the sprocket, whereby movement of the sprocket may move the arm toward the film coiling device.

7. In a photographic apparatus, the combination with a film coiling device, of a film feeding device for advancing film to the film coiling device, means for determining the size of the film coiled on the film coiling device including a swinging arm and connections between said arm and said film feeding device for moving the former by the latter.

8. In a photographic apparatus, the combination with a film coiling device, of a film feeding device for advancing film to the film coiling device, means for determining the size of the film coiled on the film coiling device including a swinging arm, movable through the film feeding device, a switch carried by said swinging arm whereby a circuit may be made through the arm striking a convolution of film.

9. In a photographic apparatus, the combination with a film coiling device, of a film feeding device for advancing film to the film coiling device, a power drive, connections between the power drive, film coiling and film feeding devices, a movably mounted switch, connections between the power drive and switch for swinging the latter toward the film.

10. In a photographic apparatus, the combination with a film coiling device, of a film feeding device for advancing film to the film coiling device, a power drive, connections between the power drive, film coiling and film feeding devices, a movably mounted switch, connections between the power drive and switch for swinging the latter to and from the film coiling device, whereby the switch in the circuit may be operated through contact with a convolution of film of predetermined size.

11. In a photographic apparatus, the combination with a film coiling device, of a film feeding device for advancing film to the film coiling device, a power drive, connections between the power drive, film coiling and film feeding devices, a movably mounted switch, connections between the power drive and switch for swinging the latter back and forth through a definite cycle, and in a definite path, said film coiling device being so located with respect to the path of the switch that a convolution of film on the coiling device may lie in the path of said switch, said swinging switch being operable through contact with a convolution of film.

12. In a photographic apparatus, the combination with a film coiling device, of a film feeding device, and a power drive connected to the film feeding and coiling devices, a pivotally mounted switch, and means for oscillating said switch through a definite path connected to said power drive, said coiling device being adapted to position a convolution of film in the path of said switch whereby said switch may be operated.

13. In a photographic apparatus, the combination with a film coiling device, of a film feeding device, and a power drive connected to the film feeding and coiling devices, a pivotally mounted switch, means for oscillating said switch through a definite path connected to said power drive, said switch comprising a pair of pivoted arms normally separated but being capable of being moved together, and a spring tending to hold the switch arms apart, said coiling device being adapted to position a convolution of film in the path of said switch whereby said switch may be operated.

Signed at Rochester, New York, this 17th day of December, 1929.

EDWIN C. FRITTS.

CERTIFICATE OF CORRECTION.

Patent No. 1,849,227.             Granted March 15, 1932, to

EDWIN C. FRITTS.

It is hereby certified that error appears in the printed specification of the above numbered patent requiring correction as follows: Page 2, line 98, for the word "above" read about; and that the said Letters Patent should be read with this correction therein that the same may conform to the record of the case in the Patent Office.

Signed and sealed this 3rd day of May, A. D. 1932.

(Seal)                                        M. J. Moore,
Acting Commissioner of Patents.